ly with the edge 3 of the opening. The free ends of these

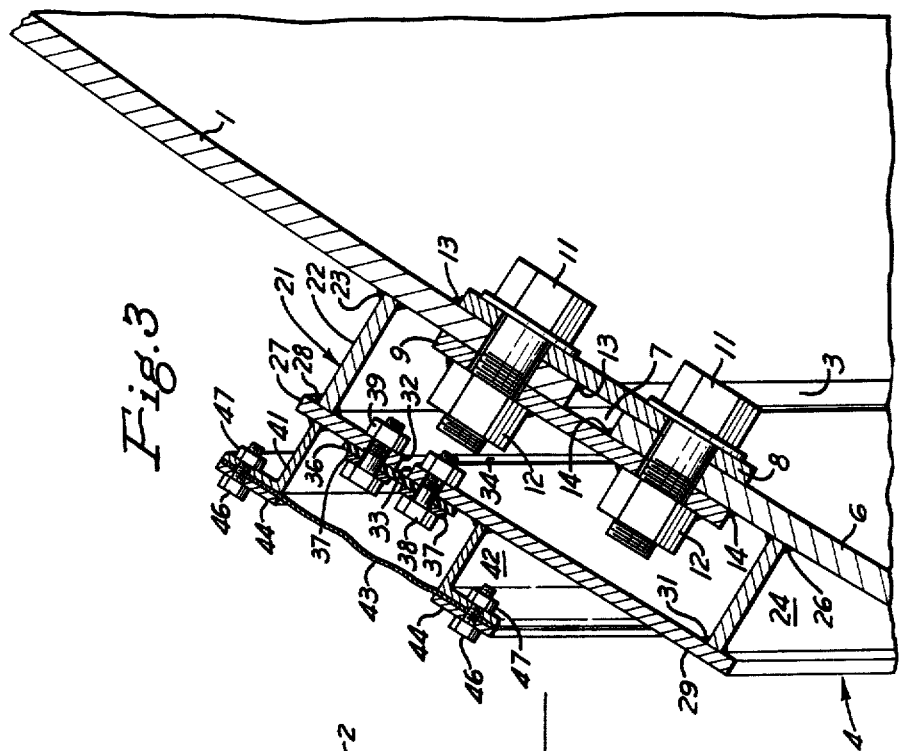

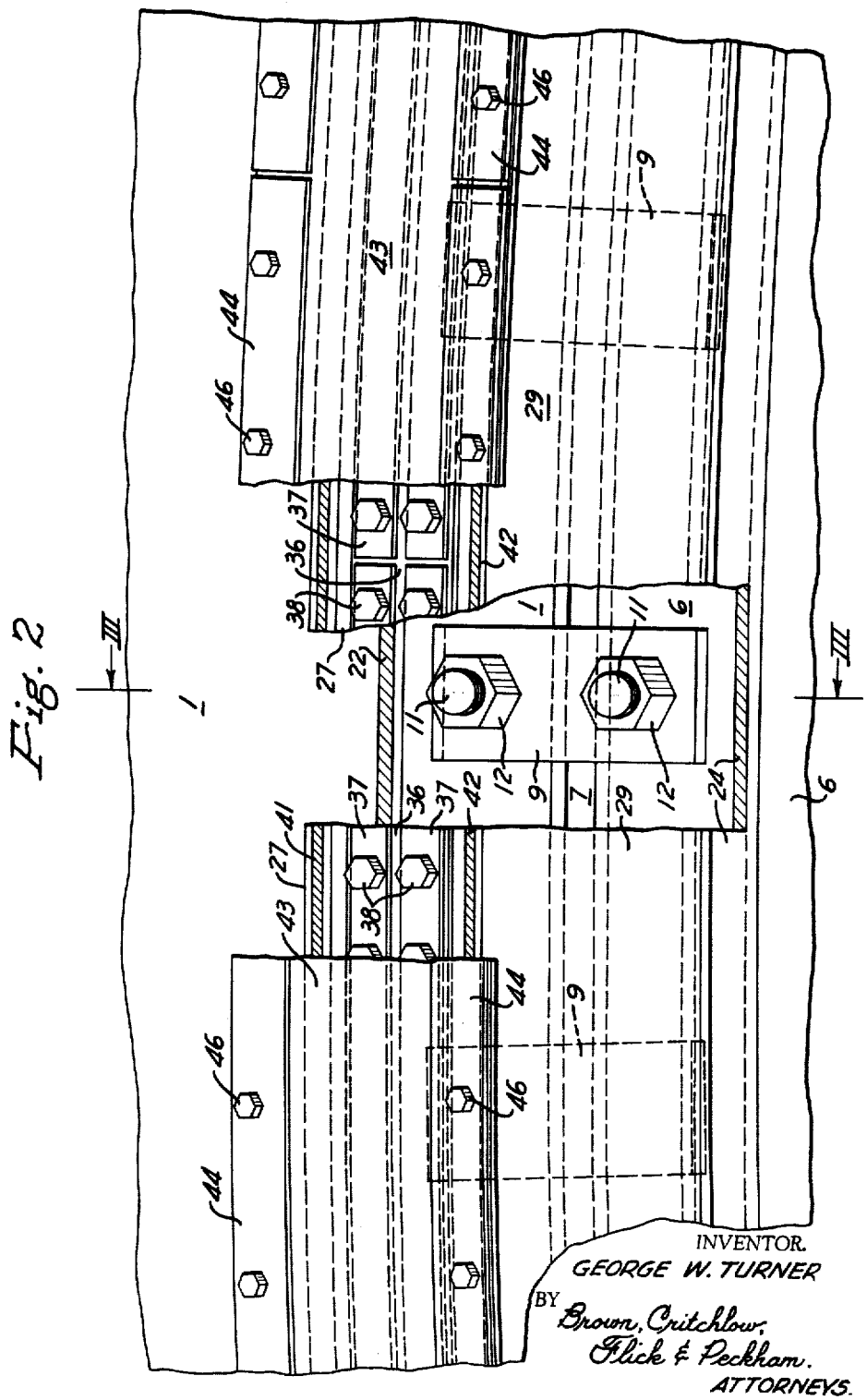

United States Patent Office 3,104,026
Patented Sept. 17, 1963

3,104,026
MEANS FOR SECURING AND SEALING LARGE DIAMETER HATCHES IN VACUUM AND PRESSURE VESSELS
George W. Turner, Sewickley, Pa., assignor to Pittsburgh-Des Moines Steel Company
Filed June 8, 1962, Ser. No. 201,050
7 Claims. (Cl. 220—81)

This invention relates to, and has for its principal object the provision of, means for securing and sealing large diameter hatches in vacuum and pressure vessels, and more particularly for creating a strong and leak-proof connection between the hatch and vessel, without expensive machining operations in the shop or in the field.

Other objects of the invention will be apparent from the following description of a preferred embodiment, in connection with the attached drawings, in which:

FIG. 1 is an elevation of a vacuum (or pressure) vessel having a large diameter access hatch and showing a portion of the hatch removed;

FIG. 2 is an enlarged detail of a portion of the joint between the hatch and vessel of FIG. 1; and FIG. 3 is a section along line III—III of FIG. 2.

In accordance with this invention, the pressure or vacuum vessel is provided with a large, preferably circular, opening, which is closed by a hatch cover that includes a rigid plate conforming to the shape of, but slightly smaller than, the opening. A first set of spaced lugs is secured to the inside of the vessel around the opening and projects beyond the edge of the opening to engage the inside of the hatch plate when the latter is positioned in the opening. A second set of spaced lugs is secured around the outside edge of the hatch plate and projects beyond that edge to engage the outside of the vessel. Means are provided for securing the projecting portions of both sets of lugs to vessel and plate for holding the latter in position in the opening. The foregoing structure provides a strong mechanical connection between hatch and vessel, leaving an annular space between them that is separately sealed. This seal includes separate ring flanges, one secured to the vessel around the opening therein, and the other secured to the hatch plate adjacent its edge. When the hatch is in place, these rings are concentric. To the outer edge of each ring is fixed a cover flange extending towards the other ring flange. The opposed edges of the two cover flanges nearly, but not quite, touch each other; and the clearance space between them is sealed by an annular strip of sealing material removably secured to, and in sealing engagement with, each cover flange. This annular space is sufficiently narrow that the sealing material will easily withstand external atmospheric pressure when the vessel is evacuated to a high vacuum, or substantial pressure inside the vessel when the latter is used as a pressure vessel.

Referring to the drawings, a vacuum, or (as the case may be) a pressure, vessel 1 is conventionally supported on legs 2 (only some of which are shown in FIG. 1). The vessel is provided with a circular opening of considerable diameter, for example, on the order of twenty five feet, which is defined by an edge 3. This opening is closed by a hatch cover 4, which includes a circular hatch plate 6 of slightly smaller diameter than the opening in the vessel, and conforms generally to the curvature of the vessel, which in the illustrated embodiment is a hollow sphere. If desired, the hatch plate can be cut from the side of an entire vessel, leaving an annular clearance space 7 between the edge of the plate and the edge of the opening.

The hatch plate is held in position in the opening of spherical vessel 1 by two sets of bolting lugs 8 and 9 and by bolts 11 and nuts 12. One set of lugs 8 is secured to the inside of the sphere, as by welds 13, in spaced relation around the edge 3 of the opening. The free ends of these lugs project beyond that edge and act as supporting surfaces for the inner side of hatch plate 6. The second set of lugs 9 is secured to the hatch plate, as by welds 14, with the free ends of the lugs projecting beyond the edge of the plate so as to engage and be supported by the outer surface of the sphere. Preferably, both sets of lugs are so spaced that one set can be superimposed in matching correspondence above the other set, to permit pairs of lugs (one from each set) to be connected together at each end by a bolt 11 and nut 12. As best shown in FIG. 3, each bolt in the inner row passes through two lugs and the hatch plate, and each bolt in the outer row through two lugs and the shell of the vessel. The holes in each of these members for receiving the bolts are preferably made somewhat oversize, so that there will be no difficulty in aligning them and passing the bolts therethrough.

In accordance with this invention, no attempt is made to seal directly the annular clearance space 7 between the edge of the opening in the vessel and the adjacent edge of the hatch plate. This annular space is sealed indirectly by a box-like structure 21, the sides of which comprise of two flange rings. One ring 22 is secured by welds 23 to the vessel around the opening therein, while ring 24 (concentric with ring 22) is secured by welds 26 to the hatch plate adjacent its edge. These rings also act as stiffening members for the adjacent portions of the vessel and plate. Additional stiffening members may also be provided if desired. The top of the box-like structure includes a cover flange 27, fastened by welds 28 to the outer edge of ring 22, and a second cover flange 29 secured by welds 31 to ring 24. Cover flange 27 is made narrow enough to avoid interfering with the removal of the hatch plate 6 and its attached lugs 9. Welds 23, 26, 28, and 31 are continuous welds that provide sealed joints between the welded members. The two cover flanges 27 and 29 lie in substantially the same plane (when the hatch cover is in position in the opening), and their opposed inner edges 32 and 33 almost, but not quite, touch each other, leaving a clearance space 34 between them. This clearance space is effectively sealed by an annular sealing strip 36, which may be of rubber or other suitable material, compressed between the cover flanges and metal clamping strips 37 by bolts 38 and nut 39.

If desired, the seal just described may be protected from the weather by an additional closure member that includes angle rings 41 and 42 welded, respectively, to cover flanges 27 and 29, and also includes a flexible membrane sealing material 43 clamped on the outer surfaces of rings 41 and 42 by strips 44 and by bolts 46 and nuts 47.

In attaching and removing the hatch plate described herein, all of the bolts are tightened or removed from the outside, except bolts 11, which are tightened or removed from inside the vessel. Ingress and egress to the vessel for this purpose is obtained through a small manhole 48. If desired, as a matter of convenience, nuts 12 may be welded to lugs 9, and nuts 39 welded to cover flanges 27 and 29.

It is among the advantages of this invention that it provides means for mechanically securing, and separate means for sealing, large hatch covers in either pressure or vacuum vessels without machined mating surfaces, which require expensive precision manufacture of intricate designs with the use of large boring mill equipment and careful assembly in the field. Moreover, the hatch of this invention can be quickly, safely, and economically added to existing vacuum and pressure vessels. Another advantage is that there are no critical clearances between the hatch plate and the vessel, while the means for supporting the hatch plate has an inherent flexibility that permits accommodation to slight distortions of vessel or plate under different ambient conditions.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A removable hatch for a large pressure or vacuum vessel provided with a large opening to be closed by the hatch, the hatch comprising: a rigid hatch plate conforming to the shape of, but slightly smaller than, the opening; a first set of spaced lugs secured to the vessel and projecting beyond the edge of the opening to engage the inner side of the plate; a second set of spaced lugs secured to the plate and projecting beyond the edge of the plate to engage the outer side of the vessel; means for removably securing the projecting portions of each set of lugs to plate and vessel, respectively; a ring flange mounted on the outer surface of the vessel adjacent to and surrounding the opening therein; a second ring flange mounted on the plate adjacent the edge thereof; a separate cover flange mounted on each ring flange and extending towards the other ring flange, with a clearance space between the opposed edges of the two cover flanges; and sealing means removably secured to both cover flanges adjacent their opposed edges and extending across the clearance space between them for sealing that space.

2. A removable hatch for a large pressure or vacuum vessel provided with a large opening in its wall to be closed by the hatch, the hatch comprising: a rigid hatch plate conforming to the shape of, but slightly smaller than, the opening; a first set of spaced lugs secured to the inner side of the vessel wall and projecting beyond the edge of the opening to engage the inner side of the plate; a second set of spaced lugs secured to the outer side of the plate and projecting beyond the edge of the plate to engage the outer side of the vessel; means for removably securing the projecting portions of each set of lugs to plate and vessel, respectively; a ring flange mounted on the outer surface of the vessel adjacent to and surrounding the opening therein; a second ring flange mounted on the plate adjacent the edge thereof and substantially concentric with the first ring flange; a separate cover flange mounted on each ring flange and extending towards the other ring flange, with a clearance space betwen the opposed edges of the two cover flanges; and sealing means removably secured to both cover flanges adjacent their opposed edges and extending across the clearance space between them for sealing that space.

3. Apparatus according to claim 2, in which there are as many lugs in one set as in the other set, and in which the lugs of the second set can be superimposed in alignment with those of the first set.

4. Apparatus according to claim 3, in which the means for securing the projecting portions of the lugs includes a first set of bolts passing through the projecting ends of the first set of lugs and the hatch plate and the secured ends of the second set of lugs and a second set of bolts passing through the second ends of the first set of lugs and the vessel wall and the projecting ends of the first set of lugs.

5. Apparatus according to claim 2 that also includes an extra weather seal comprising a separate angle ring mounted on each cover flange adjacent the opposed edges of those flanges and sealing material secured to the outer faces of the angle rings and in sealing engagement therewith.

6. Apparatus according to claim 2, in which the sealing means includes an annular strip of resilient impermeable material clamped to the outer surface of the cover flanges.

7. A removable hatch for a large pressure or vacuum vessel provided with a large diameter circular opening in its wall that is to be closed by the hatch, the hatch comprising: a rigid circular hatch plate conforming to the external curvature of the vessel and having a diameter slightly less than that of the opening, a first set of spaced lugs secured to the inside of the vessel and projecting beyond the edge of the opening to engage the inner side of the plate; a second set of spaced lugs secured to the outside of the plate and projecting beyond the edge of the plate to engage the outside of the vessel; means for removably securing the projecting portions of each set of lugs to plate and vessel, respectively; a ring flange mounted on the outer surface of the vessel adjacent to and surrounding the second set of lugs supported thereon; a second ring flange mounted on the plate adjacent to and surrounded by the second set of lugs and substantially concentric with the first ring flange; a separate cover flange mounted on each ring flange and extending towards the other ring flange, with a clearance space between the opposed edges of the two cover flanges; and removable means for sealing this clearance space between the cover flanges.

No references cited.

UNITED STATES PATENT OFFICE
CERTIFICATE OF CORRECTION

Patent No. 3,104,026                          September 17, 1963

George W. Turner

It is hereby certified that error appears in the above numbered patent requiring correction and that the said Letters Patent should read as corrected below.

Column 3, line 46, for "betwen" read -- between --; column 4, line 12, for "second" read -- secured --.

Signed and sealed this 7th day of April 1964.

(SEAL)
Attest:
ERNEST W. SWIDER

Attesting Officer

EDWARD J. BRENNER

Commissioner of Patents